(12) United States Patent
Jakubowski (10) Patent No.: US 11,001,764 B2
(45) Date of Patent: May 11, 2021

(54) COPOLYMERS USEFUL AS WATER CLARIFIERS AND FOR WATER-OIL SEPARATION (71) Applicant: BAKER HUGHES INCORPORATED, Houston, TX (US)

(72) Inventor: Wojciech Jakubowski, Sugar Land, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 223 days.

(21) Appl. No.: 15/348,434

(22) Filed: Nov. 10, 2016

(65) Prior Publication Data

US 2017/0275536 A1  Sep. 28, 2017

Related U.S. Application Data (60) Provisional application No. 62/258,776, filed on Nov. 23, 2015.

(51) Int. Cl.
| *C10G 33/04* | (2006.01) |
| *C10G 33/00* | (2006.01) |
| *C08F 220/56* | (2006.01) |
| *C08F 220/20* | (2006.01) |
| *C08F 20/28* | (2006.01) |
| *C08F 20/34* | (2006.01) |
| *C08F 20/56* | (2006.01) |

(52) U.S. Cl.
CPC ............. *C10G 33/04* (2013.01); *C08F 20/28* (2013.01); *C08F 20/34* (2013.01); *C08F 20/56* (2013.01); *C08F 220/20* (2013.01); *C08F 220/56* (2013.01); *C10G 33/00* (2013.01)

(58) Field of Classification Search
CPC .......................... C10G 33/00–08; B01D 17/04; B01D 17/047; C08F 20/28; C08F 20/34; C08F 20/56
See application file for complete search history.

(56) References Cited

U.S. PATENT DOCUMENTS

| 4,120,815 | A | 10/1978 | Raman |
| 4,179,369 | A | 12/1979 | Bradley |
| 4,343,730 | A | 8/1982 | Becker |
| 5,013,452 | A | 5/1991 | Bellos et al. |
| 5,100,582 | A | 3/1992 | Bhattacharyya |
| 5,693,216 | A * | 12/1997 | Hart ...... B01D 17/047 208/188 |
| 5,730,882 | A | 3/1998 | Gallup et al. |
| 5,921,912 | A * | 7/1999 | Hart ...... B01D 17/047 210/708 |
| 6,020,422 | A | 2/2000 | Connors et al. |
| 6,025,426 | A | 2/2000 | Hurlock |
| 6,190,561 | B1 | 2/2001 | Nagan |
| 6,369,182 | B1 * | 4/2002 | Whipple ............. C02F 11/14 210/705 |
| 7,470,744 | B2 | 12/2008 | Behles |
| 9,260,545 | B1 | 2/2016 | Squicciarini |
| 2007/0244248 | A1 * | 10/2007 | Behles ...... C08F 2/24 524/555 |
| 2011/0257328 | A1 * | 10/2011 | Debord ............ B01D 17/047 524/555 |
| 2012/0031813 | A1 | 2/2012 | Schaefer et al. |
| 2012/0043258 | A1 | 2/2012 | Schaefer et al. |
| 2013/0228524 | A1 | 9/2013 | Soderstrom et al. |
| 2014/0243464 | A1 * | 8/2014 | Debord ............ B01D 17/047 524/377 |

FOREIGN PATENT DOCUMENTS

GB 1563957 A 4/1980

* cited by examiner

*Primary Examiner* — Michelle Stein
(74) *Attorney, Agent, or Firm* — Mossman, Kumar & Tyler, P.C.

(57) ABSTRACT

A copolymer useful as a water clarifier for a water phase of a production fluid is selected from those with a first monomer and a second monomer, and in one non-limiting embodiment having the general formula:

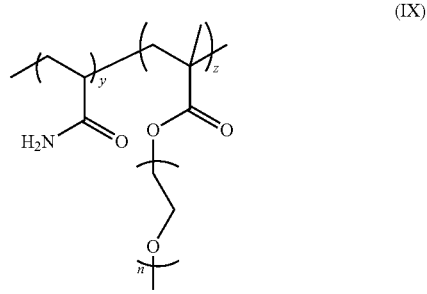

(IX)

wherein y is 10 to 50,000; z is 1 to 10,000 and n is 1 to 250. The copolymer may optionally include a third monomer. In an optional embodiment of the process, the fluid has a hydrocarbon phase, and the process further involves simultaneously drying the hydrocarbon phase of the fluid along with clarifying the water phase.

10 Claims, 7 Drawing Sheets

FIG. 1

FIG. 2 – Example 7

FIG. 3 – Example 8

FIG. 4 – Example 9

FIG. 5 – Example 10

FIG. 6 – Example 11

FIG. 7 – Example 12

COPOLYMERS USEFUL AS WATER CLARIFIERS AND FOR WATER-OIL SEPARATION

CROSS-REFERENCE TO RELATED APPLICATIONS

This application claims the benefit of U.S. Provisional Patent Application Ser. No. 62/258,776 filed Nov. 23, 2016, incorporated herein in its entirety by reference.

FIELD OF THE DISCLOSURE

The invention relates to polymers useful in achieving oil and water separation and water clarification. The invention more particularly relates to such polymers that are copolymers of acrylamide and poly(ethylene glycol) methyl ether methacrylate or a copolymer of these two monomers and (3-acrylamidopropyl)-trimethylammonium chloride, and the like.

BACKGROUND

Water produced from petroleum recovery, and particularly from steamassisted gravity drainage (SAGD) petroleum recovery operations generally comprises an oil phase, a water phase and an emulsion of water and oil. Each of these phases may also have finely-divided solids suspended therein. Just as it is desirable to extract "dry" oil from the produced water for sale and transport, it is also desirable to extract "clean" water that is suitable for reuse or disposal by reinjection into a subterranean formation or which is otherwise disposed.

Chemical water clarification is a convenient and effective method in effecting the release of water from water-in-oil and oil-in-water emulsions. Water clarification can be important for wastewater handling and volume reduction, reuse of the water, e.g. for production of steam, food production and processing, and even in chemical manufacturing.

Water clarification may be particularly important in the production of oil and gas for several reasons. One reason is because in the normal course of producing the oil and gas from a subterranean formation, at some point significant amounts of water may be co-produced with the oil and gas. When the water is co-produced as an emulsion, it is usually necessary to clarify the water after an emulsion has been broken prior to any reuse or disposal of the water. In some non-limiting embodiments, it may also be necessary to "dry" the oil as much as possible by reducing the amount of water in the oil.

An emulsion may be a natural emulsion due to the presence of naturally occurring emulsifying agents, or the emulsion may be an artifact of the use of additives or other recovery processes. For example, the use of steam and caustic injection or combustion processes, for in-situ recovery of heavy oils, may be complicated by the production of viscous emulsions of oil, water and clay. Crude oil may be found in a geological reservoir in association with gas and saline or fresh formation water. A natural emulsion may form simply due to shear and pressure drops at the well head, chokes and valves. Once these emulsions have been broken, it is necessary to use a water clarifier in order to lower any contaminants remaining in the water to acceptable levels for reuse or disposal. At SAGD facilities, demulsifier and water clarifier are injected together in order to break a "reverse" emulsion and clarify the water phase at the same time. Very often there is a synergy between those two compounds and, for example, water clarifier may help to dehydrate oil phase as well.

One well-known water clarifier is polydiallyldimethylammonium chloride (shortened to polyDADMAC), which is a homopolymer of diallyldimethylammonium chloride (DADMAC), and which has been used as a coagulant aid, and in some cases as a replacement for inorganic metal salt coagulants. When organic polymers such as polyDADMAC are added to water with particulates, the high molecular weight compounds adsorb onto particle surfaces and through interparticle bridging coalesce with other particles to form floc, which is skimmed from the water. The copolymers of the current invention remove oil droplets which are suspended in the form of an emulsion from the water phase. The removal of particulates and solids are secondary targets.

Water clarifiers currently in use include halogenated polycondensate as well as poly(meth)acrylamide and poly(meth)acrylate type polymers having a low (3-5) pH. The combination of halogen ions and a low pH may cause corrosion problems in the storage tanks and transfer lines for these clarifiers. Very often a low pH is required for the polymers containing halogen ions to maintain their stability. Due to their lower stability, those polymers may gel at the surface of the storage tanks and transfer lines in the presence of multivalent metal ions and increase the rate of the corrosion process.

It is therefore highly desirable to have a water clarifier that has both a higher stability, does not form a gel, and is less corrosive in storage than currently used water clarifiers.

SUMMARY

In one aspect, the invention is a process for clarifying an aqueous phase of a fluid comprising a hydrocarbon phase and the aqueous phase, where the process includes admixing the fluid with a copolymer, where the copolymer comprises a copolymer of a first monomer selected from the group consisting of poly(ethylene glycol) methyl ether methacrylate (PEGMA), poly(ethylene glycol) methyl ether acrylate (PEGA), poly(ethylene glycol) methacrylate, poly(ethylene glycol) acrylate, poly(propylene glycol) methyl ether methacrylate (PPGMA), poly(propylene glycol) methyl ether acrylate (PPGA), poly(propylene glycol) methacrylate, poly(propylene glycol) acrylate and combinations thereof, and a second monomer selected from the group consisting of acrylamide, 2-hydroxyethyl acrylate, 2-hydroxyethyl methacrylate, hydroxypropyl acrylate, hydroxypropyl methacrylate, 4-hydroxybutyl acrylate, N-hydroxyethyl acrylamide, N-hydroxymethyl acrylamide, N-isopropylacrylamide, N-methylacrylamide, N-ethylacrylamide, N-propylacrylamide, methacrylamide, N,N-dimethylacrylamide, N,N-diethylacrylamide, N-tert-butylacrylamide, N-[3-(dimethylamino)propyl]methacrylamide, N-[3-(dimethylamino)propyl]acrylamide, 2-(dimethylamino)ethyl acrylate, 2-(dimethylamino)ethyl methacrylate, 3-(dimethylamino)propyl acrylate, 3-(dimethylamino)propyl methacrylate, 2-(diethylamino)ethyl methacrylate, 2-(diethylamino)ethyl acrylate and combinations thereof, where the copolymer is present in the fluid in an amount effective to clarify the aqueous phase and at least partially removing the hydrocarbon phase from the aqueous phase.

In another non-limiting embodiment of the invention, the foregoing first and second monomers are copolymerized with a third monomer consisting of (3-acrylamidopropyl) trimethylammonium chloride (APTAC), [2-(acryloyloxy)ethyl]trimethylammonium chloride (AETAC), [2-(methacryloyloxy)ethyl]trimethylammonium chloride (MAETAC), [3-(methacryloylamino)propyl]trimethylammonium chloride (MAPTAC), 2-acrylamido-2-methylpropane sulfonic acid, [2-(methacryloyloxy)ethyl]dimethyl-(3-sulfopropyl)ammonium hydroxide, [3-(methacryloylamino)propyl]dimethyl(3-sulfopropyl)ammonium hydroxide, acrylic acid, methacrylic acid, styrenesulfonic acid, diallyldimethyl ammonium chloride (DADMAC), acryloyloxyethyldimethylbenzyl ammonium chloride (AEDBAC), methacryloyloxyethyldimethylbenzyl ammonium chloride (MEDBAC) or combinations thereof. The copolymer is present in the fluid in an amount effective to clarify the aqueous phase, in a non-restrictive version in SAGD produced fluids, and the process may also include dehydrating the oil phase.

DESCRIPTION

In one non-limiting embodiment, the method of the disclosure includes admixing a multiphase fluid with an additive comprising a copolymer of a first monomer and a second monomer, in a non-limiting example, a copolymer of poly(ethylene glycol) methyl ether methacrylate (PEGMA) and acrylamide. In some embodiments, the multiphase fluid has at least two phases; a hydrocarbon phase and an aqueous phase. In other non-limiting embodiments, there is a third phase: solids or sediment. In still other embodiments, the fluid may be a hydrocarbon phase or an aqueous phase; with solids being the second phase. In the methods described herein the copolymers clarify the water phase but may also help to dry the oil phase present. "Drying the oil phase" is defined herein to mean remove water from the oil phase.

In more detail, the copolymer is a copolymer of a first monomer selected from the group consisting of poly(ethylene glycol) methyl ether methacrylate (PEGMA), poly(ethylene glycol) methyl ether acrylate (PEGA), poly(ethylene glycol) methacrylate, poly(ethylene glycol) acrylate, poly (propylene glycol) methyl ether methacrylate (PPGMA), poly(propylene glycol) methyl ether acrylate (PPGA), poly (propylene glycol) methacrylate, poly(propylene glycol) acrylate, and combinations thereof, and a second monomer selected from the group consisting of, including but not limited to acrylamide, 2-hydroxyethyl acrylate, 2-hydroxyethyl methacrylate, hydroxypropyl acrylate, hydroxypropyl methacrylate, 4-hydroxybutyl acrylate, N-hydroxyethyl acrylamide, N-hydroxymethyl acrylamide, N-isopropylacrylamide, N-methylacrylamide, N-ethylacrylamide, N-propylacrylamide, methacrylamide, N,N-dimethylacrylamide, N,N-diethylacrylamide, N-tert-butylacrylamide, N-[3-(dimethylamino)propyl]methacrylamide, N-[3-(dimethylamino)propyl]acrylamide, 2-(dimethylamino)ethyl acrylate, 2-(dimethylamino)ethyl methacrylate, 3-(dimethylamino)propyl acrylate, 3-(dimethylamino)propyl methacrylate, 2-(diethylamino)ethyl methacrylate, 2-(diethylamino)ethyl acrylate and combinations thereof.

In further detail, the structures of some of the monomers mentioned above have the following formula structures, where n ranges from 1 to 250 in all cases:

poly(ethylene glycol) methyl ether methacrylate (PEGMA) (I), poly(ethylene glycol) methyl ether acrylate (PEGA) (II), poly(ethylene glycol) methacrylate (III), poly(ethylene glycol) acrylate (IV), poly(propylene glycol) methyl ether methacrylate (PPGMA) (V), poly(propylene glycol) methyl ether acrylate (PPGA) (VI), poly(propylene glycol) methacrylate (VII), and poly(propylene glycol) acrylate (VIII).

(I)

(ii)

(III)

(IV)

-continued

(V)

(VI)

(VII)

(VIII)

In one non-limiting embodiment of the practice of the method, the multiphase fluid is admixed with a copolymer of poly(ethylene glycol) methyl ether methacrylate (PEGMA) and acrylamide. These copolymer compounds have the general formula:

(IX)

wherein y is independently 10 to 50,000 or alternatively, independently 50 to 10,000; z is independently 1 to 10,000 or alternatively, independently 10 to 10,000 and n is independently 1 to 250 or alternatively, independently 2 to 50. In a specific, non-limiting suitable example, y=2700, z=270 and n=5. The terminal groups will depend on the polymerization conditions and polymerization mechanism. It is very hard to specify them in general since there are a broad range of possibilities, e.g. in free radical polymerization the terminal group will depend on the type of radical initiator, the type of transfer agent, and side reactions which can also occur. When the word "independently" is used herein with respect to a range, any lower threshold may be used together with any upper threshold to give a suitable alternative range. In a non-limiting example, y may range from 10 to 10,000.

In another non-limiting embodiment, the copolymer is a copolymer of acrylamide, 2-hydroxyethyl acrylate and poly(ethylene glycol) methyl ether methacrylate (PEGMA) having the general formula:

(X)

wherein y is an integer from 10 to 50,000; z is an integer from 1 to 10,000 and n is an integer from 1 to 250.

In an optional embodiment of the method, the copolymer of poly(ethylene glycol) methyl ether methacrylate and acrylamide may be dispersed in a solvent or carrier fluid. Suitable solvents and carrier fluids may be dependent on, but are not necessarily limited by, the processes used to synthesize the copolymer. One non-limiting process for the synthesis of the copolymer is a solution type of polymerization process performed in the aqueous phase. As a copolymer is fully water soluble, it will be delivered as a water solution product. Other non-limiting solvents may be added to the polymer/water solution that are compatible with the formulation and miscible with water. Such non-limiting solvents include but are not necessarily limited to, methanol, ethanol, n-propanol, iso-propanol, ethylene glycol, propylene glycol, acetone, acetic acid and mixtures thereof. In another, non-limiting process, copolymer may be synthesized in a dispersion polymerization process. In this process, a non-limiting solvent which is much more hydrophobic may be used as a carrier fluid including but not necessarily limited to toluene, xylene, heptane and mixtures thereof.

In another non-limiting embodiment, the method of the disclosure includes admixing a multiphase fluid with an additive comprising a copolymer of a first monomer, a second monomer and a third monomer, in a non-limiting example, a copolymer of poly(ethylene glycol) methyl ether methacrylate (PEGMA), acrylamide, and (3-acrylamidopropyl)trimethylammonium chloride (APTAC). In one non-restrictive embodiment, the first monomer, the second monomer, and the third monomer are different each from the other. In some non-limiting embodiments, the multiphase fluid has two phases; a hydrocarbon phase and an aqueous phase. In other non-restrictive versions, there is a third phase comprising solids. In still other embodiments, the fluid may be a hydrocarbon phase or an aqueous phase; with solids being the second phase.

In more detail, the copolymer is a copolymer of a first monomer selected from the group consisting of poly(ethylene glycol) methyl ether methacrylate (PEGMA), poly(ethylene glycol) methyl ether acrylate (PEGA), poly(ethylene glycol) methacrylate, poly(ethylene glycol) acrylate, poly(propylene glycol) methyl ether methacrylate (PPGMA), poly(propylene glycol) methyl ether acrylate (PPGA), poly(propylene glycol) methacrylate, poly(propylene glycol) acrylate, and combinations thereof, a second monomer selected from the group consisting of, but not limited to acrylamide, 2-hydroxyethyl acrylate, 2-hydroxyethyl methacrylate, hydroxypropyl acrylate, hydroxypropyl methacrylate, 4-hydroxybutyl acrylate, N-hydroxyethyl acrylamide, N-hydroxymethyl acrylamide, N-isopropylacrylamide, N-methylacrylamide, N-ethylacrylamide, N-propylacrylamide, methacrylamide, N,N-dimethylacrylamide, N,N-diethylacrylamide, N-tert-butylacrylamide, N-[3-(dimethylamino)propyl]methacrylamide, N-[3-(dimethylamino)propyl]acrylamide, 2-(dimethylamino)ethyl acrylate, 2-(dimethylamino)ethyl methacrylate, 3-(dimethylamino)propyl acrylate, 3-(dimethylamino)propyl methacrylate, 2-(diethylamino)ethyl methacrylate, 2-(diethylamino)ethyl acrylate and combinations thereof, and a third monomer consisting of, but not limited to (3-acrylamidopropyl)trimethylammonium chloride (APTAC), [2-(acryloyloxy)ethyl]trimethylammonium chloride (AETAC), [2-(methacryloyloxy)ethyl]trimethylammonium chloride (MAETAC), [3-(methacryloylamino)propyl]trimethylammonium chloride (MAPTAC), 2-acrylamido-2-methylpropane sulfonic acid, [2-(methacryloyloxy)ethyl]dimethyl-(3-sulfopropyl)ammonium hydroxide, [3-(methacryloylamino)propyl]dimethyl(3-sulfopropyl)ammonium hydroxide, acrylic acid, methacrylic acid, styrenesulfonic acid, diallyldimethyl ammonium chloride (DADMAC), acryloyloxyethyldimethylbenzyl ammonium chloride (AEDBAC), methacryloyloxyethyldi-methylbenzyl ammonium chloride (MEDBAC) and combinations thereof.

In one non-limiting embodiment of the practice of the method, the multiphase fluid is admixed with a copolymer of poly(ethylene glycol) methyl ether methacrylate (PEGMA), 2-hydroxethyl acrylate, and [2-(acryloyloxy)ethyl]trimethylammonium chloride (AETAC). These compounds have the general formula:

(XI)

wherein x is independently 10 to 50,000 or alternatively, independently 50 to 10,000; y is independently 1 to 10,000 or alternatively, independently 10 to 10,000; z is independently 1 to 10,000 or alternatively, independently 10 to 10,000; and n is independently 1 to 250 or alternatively, independently 2 to 50. In a specific, non-limiting suitable example, x=1240, y=210, z=150 and n=5.

In an optional embodiment of the method, the copolymer of acrylamide, poly(ethylene glycol) methyl ether methacrylate and (3-acrylamidopropyl)trimethylammonium chloride may be dispersed in a solvent or carrier fluid. Suitable solvents and carrier fluids dependent on but are not necessarily limited by the processes used to synthesize the copolymer. One non-limiting process for the synthesis of the copolymer is a solution type of polymerization process performed in the aqueous phase. As a copolymer is fully water soluble, it will be delivered as a water solution product. Other non-limiting solvents may be added to the polymer water solution that are compatible with the formulation and miscible with water. Such non-limiting solvents include but are not necessarily limited to methanol, ethanol, n-propanol, iso-propanol, ethylene glycol, propylene glycol, acetone, acetic acid and mixtures thereof. In another, non-limiting process, the copolymer may be synthesized in a dispersion polymerization process. In this process, a non-limiting solvent which is much more hydrophobic may be used as a carrier fluid including but not necessarily limited to toluene, xylene, heptane and mixtures thereof.

The copolymers may be particularly useful in production fluid water clarification and also working together with a demulsifier to dehydrate the oil phase in SAGD produced fluids. For the purposes of the methods described herein, a production fluid is the often multiphase admixture of hydrocarbons, water, soluble inorganic materials and particulate matter produced from an oil and gas well. The polymers useful with the method of the disclosure may be used, optionally in combination with other additives, to treat production fluid at the surface in a separator, or even downstream from the production well to facilitate the separation of the hydrocarbon from the water in the production fluid to produce a hydrocarbon phase that can be efficiently and cost effectively transferred and refined. The term "production fluid" also refers to produced water, that is, water produced from a subterranean formation that needs to be "clarified" or have the hydrocarbons therein removed prior to further processing or disposal. The copolymers may be used in any way known to those of ordinary skill in the art of producing oil and gas to be useful.

In clarification applications, the polymers useful with the method of the disclosure may be used to clarify process water or wastewater. In one embodiment, halogen-free copolymers are admixed with wastewater to produce a floc that can then be separated from the water using a separator device. In another embodiment, the copolymers may be added to process water to reduce turbidity. The copolymers may be used in any way known to those of ordinary skill in the art of treating process water and wastewater to be useful.

In the processes of the disclosure, fluids may be clarified; in a non-limiting embodiment, water or an aqueous phase of a mixture or combination of an aqueous phase with some other phase may be clarified. For the purposes of this disclosure, the term "clarifying" includes any process for removing oil and solids from a water phase. For example, a process that includes a flocculation step as part of such a process would be within the scope of this term. On the other hand, flocculation is not necessarily required. In a more specific definition, water clarification is defined as removing basic sediment and oil from the water. In some non-limiting embodiments it is acceptable to have some solids in the water phase, and it is more important to remove suspended or emulsified oil from the water phase. Small solid particles as well as oil droplets may make the water turbid, and thus the water may need to be clarified.

As will be established below, clarifying the water phase is measured by water clarity (WC) and drying the hydrocarbon phase is measured by basic sediment/emulsion and free water (BS&W) achieved. It was discovered that BS&W is lower for the copolymer with PEGMA than for the copolymer without PEGMA. It will be appreciated that as a practical matter it is not possible to remove all of the BS&W, although removing as much BS&W as possible is typically a goal.

In general terms, the effective amount of copolymer in the fluid is any amount that will simultaneously clarify the aqueous phase and dry the hydrocarbon phase of the fluid. Although it is sometimes difficult to predict in advance an effective range for any particular fluid due to a number of variables including, but not necessarily limited to, the relative amounts of oil and water in the fluid, the amount of sediment in the fluid, the temperature of the process, the composition of the copolymer, etc., an effective amount of the copolymer in the fluid ranges from about 0.1 ppm independently to about 5,000 ppm; alternatively from about 1 ppm independently to about 1,000 ppm.

The following examples are provided to illustrate the invention. The examples are not intended to limit the scope of the invention and they should not be so interpreted. Amounts are in weight parts or weight percentages unless otherwise indicated.

Methods used to synthesize the copolymers useful with the method of the disclosure include, but are not limited to: emulsion polymerization, microemulsion polymerization, miniemulsion polymerization, solution polymerization, precipitation polymerization, dispersion polymerization, and suspension polymerization. Polymerization methods that can be used to control the type of copolymer, either by control of the polydispersity of the molecular weight of the polymer.

Controlled free radical polymerization methods can include, but are not limited to, ATRP (atom transfer radical polymerization), RAFT (reverse addition-fragmentation transfer polymerization), nitroxide-mediated polymerization, iodide-transfer mediated polymerization, anionic polymerization, cationic polymerization, group transfer polymerization, ring-opening polymerization, and step-growth polymerization. In one embodiment, the process is an emulsion polymerization.

In the preparation of aqueous polymer dispersions by emulsion polymerization, distinctions are generally made between batch, semibatch, and continuous processes, and different methods of adding the monomers to the reaction vessel are described. For example, in a semibatch process the monomer emulsion is prepared in a separate batching vessel and the emulsion is passed continuously into a polymerization reactor, where it is polymerized. According to a general procedure for a semibatch process, the emulsion feed stream may comprise all of the ingredients used for the emulsion polymerization, such as monomers, water, and additives, with the aqueous monomer emulsion being prepared in a separate batching vessel, referred to as the feed tank.

In other embodiments, the copolymer is prepared by a continuous process or a batch process. In a continuous process, the monomer fed continuously into the reactor while in a batch process; the monomer is reacted without the further addition of monomer. Any method of emulsion polymerization may be used with the method of the disclosure.

The copolymer may be prepared using a catalyst or, in the alternative, the polymer may be prepared using thermal energy to initiate polymerization. Any method of catalyzing and/or initiating polymerization of monomers having one or more polymerizable double bonds may be used with the method of the disclosure. For example, the monomer may be heated to from about 30° C. to about 95° C. to initiate polymerization, or may be conducted at room temperature with the proper initiating system.

In another embodiment of the method of the disclosure, once the polymerization is complete, post-crosslinking of the polymer can be done to make it more effective at water clarification or demulsification. For example, in aqueous reactions, crosslinking can be achieve by copolymerization of the monomers with acrylate or acrylamide monomers composed of at least two vinyl groups capable of polymerizing into the polymer. Examples include N, N' methylenebisacrylamide and variants thereof. Crosslinking reactions can be achieved with crosslinkers similar to bisacrylamide but can also be achieved via condensation reactions utilizing pendant hydroxyl groups (functional groups that can be present on comonomers) and crosslinkers such as anhydrides (i.e. maleic anhydride, phthalic anhydride), diisocyanates, or epichlorohydrins.

In preparing the polymers useful with the method of the disclosure, it is sometimes necessary to form the emulsion using a mixer or other means of mixing. For example, the monomers may be mixed and then an emulsion maintained using bladed mixers, static mixers, and even nozzle mixers, including solid cone nozzles, hollow cone nozzles, fan jet nozzles, smooth jet nozzles, injector nozzles, ejector nozzles, spiral nozzles, impingement jet nozzles, and two-fluid nozzles or an emulsifying baffle.

When the polymer is prepared using a catalyst, in one embodiment a free-radical catalyst is used. Suitable free-radical polymerization initiators include all those which are capable of setting off a free-radical polymerization. They may comprise either peroxides, e.g., alkali metal peroxodisulfates or organic peroxides, or azo compounds. Use may also be made of combined systems which are composed of at least one organic or inorganic reductant and at least one peroxide and/or hydroperoxide, an example being tert-butyl hydroperoxide with the sodium salt of hydroxymethanesulfonic acid or hydrogen peroxide with ascorbic acid.

Combined catalyst systems may be used which include a small amount of a metal compound which is soluble in the polymerization medium and whose metallic component is able to exist in a plurality of valence states, e.g., ascorbic acid/iron(II) sulfate/hydrogen peroxide, in which in many cases the ascorbic acid may be replaced by the sodium salt of hydroxymethanesulfonic acid, sodium sulfite, sodium hydrogen sulfite or sodium bisulfite and the hydrogen peroxide by tert-butyl hydroperoxide or alkali peroxodisulfates and/or ammonium peroxodisulfate. Another class of initiators are the ammonium or alkali metal salts of peroxosulfates or peroxodisulfates, especially sodium or potassium peroxodisulfate, and V-50*(2,2'-azobis(2-methylpropionamidine) dihydrochloride), an azo initiator. *V-50 is a trade designation of the Wako Company.

The amount of free-radical initiator used, based on the overall amount of the monomers to be polymerized, is, in one embodiment, from 0.1 to 3% by weight. For controlled free radical polymerization, the initiator or catalyst is dependent upon the method. Using ATRP methods of polymerization usually requires the use of metal salts such as, but not limited to, copper bromide. RAFT polymerization is dependent upon the use of a suitable agent for reversible transfer, such as a dithiocarbamate as well as an azo initiator such as AIBN (2,2'-azobis(2-methylpropionitrile). A suitable initiator for an anionic polymerization is sec-butyl lithium, but the method of the disclosure is not limited to this initiator.

EXAMPLES

Examples 1-6

Figure 1:
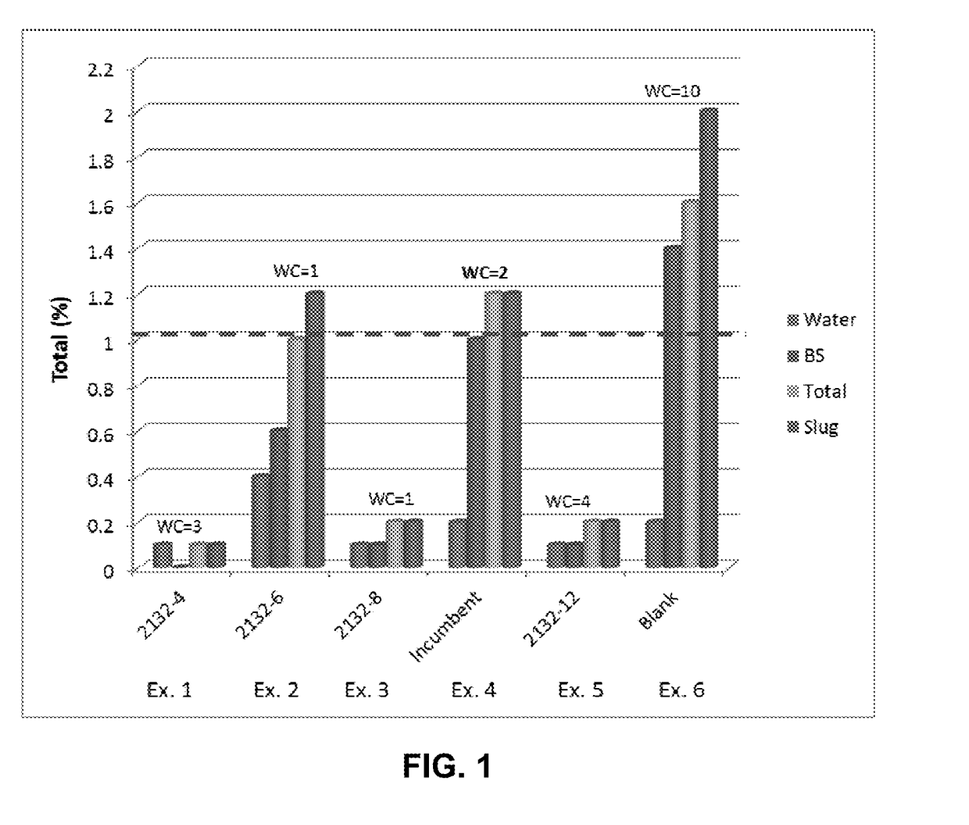
FIG. 1 is a graph of water clarification and total basic sediment/emulsion and free water (BS&W) for Examples 1-6.

Shown in FIG. 1 are cut data comparisons of a poly(meth) acrylate-based and poly(meth)acrylamide-based copolymers as compared to a blank (Example 6) with no water clarifier and an incumbent water clarifier, which is a polycondensate-type polymer with a high halogen content (Ex. 4). In Examples 1-3, clarifiers 2132-4, 2132-6 and 2132-8, respectively, are all poly(meth)acrylate-based/poly(meth)acrylamide-based copolymers that fall within the definition of the three-monomer copolymer described herein. In contrast, 2132-12 copolymer (Example 5) is an acrylate type copolymer with poly(acrylamide-co-PEGMA) that falls within the two-monomer copolymer definition described herein. The line at Total 1% corresponds to 1% of BS—refers to basic sediment, i.e. the amount of emulsion for the incumbent. Besides water clarity, the amounts of emulsion and free water in the oil phase are very important. A goal is to have the highest water clarity and lowest amount of emulsion. The water clarity (WC) scale for Examples 1-6 is 1 for the best WC and 10 for the worst WC. While 2132-12 did not have the best WC rating shown (4), this halogen-free copolymer produces very dry oil (less BS and less free water) which in some cases is even more important. In all examples, a demulsifier was added together with the water clarifier to the produced fluid. The demulsifier used in all Examples was TRETOLITE™ DMO8663X demulsifier available from Baker Hughes Incorporated. This is a typical procedure for SAGD applications. The same amount of demulsifier was used together with each water clarifier so the direct comparison of the performance of different water clarifiers was possible. In a non-limiting embodiment, an advantage of the two monomer system is that it is halogen-free (and is therefore less corrosive) although it may not clarify the water phase as well as three-monomer copolymer in some instances (Examples 1-3 compared with Example 5).

Example 7

Figure 2:
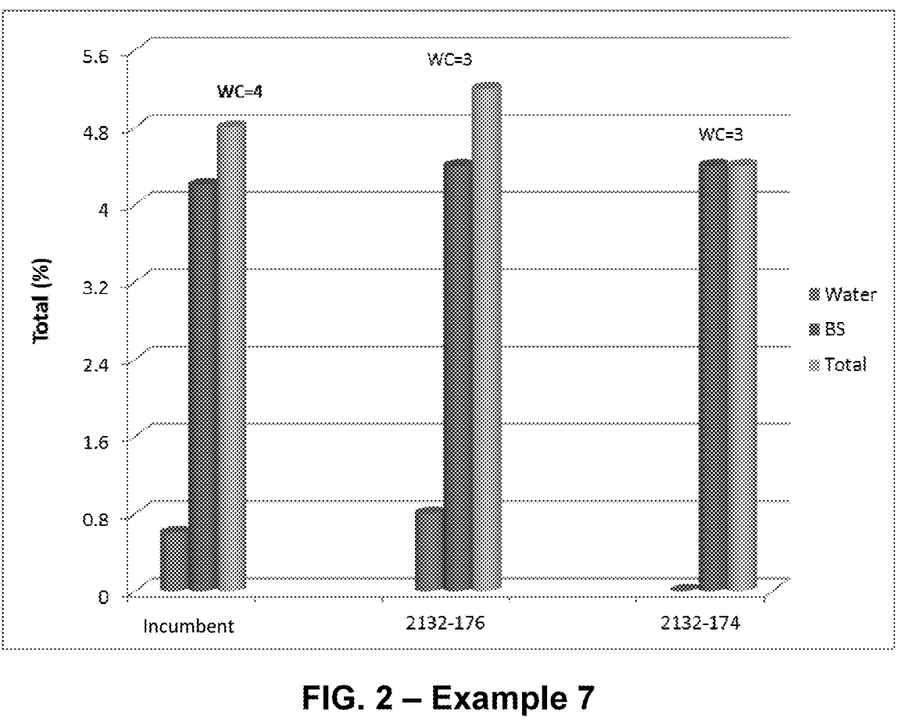
FIG. 2 is a graph showing water clarification and BS&W testing results from Example 7.

FIG. 2 presents cut data comparison for two non-limiting, copolymers of acrylamide and PEGMA water clarifiers (2132-176 and 2132-174) in accordance with the method described herein vs. a polycondensate type polymer with high halogen content which was used here as an incumbent for the comparison. Each water clarifier copolymer of acrylamide and PEGMA was added to the fluid at 150 ppm while the incumbent was added at 200 ppm. A TRETOLITE™ DMO8663X demulsifier available from Baker Hughes Incorporated was added together with the water clarifier to the produced fluid. This is a typical procedure for SAGD applications. The same amount of demulsifier was used together with each water clarifier so the direct comparison of the performance of different water clarifiers was possible. It is clear from the results that the copolymers 2132-174 and 2132-176 can efficiently clarify water (where the WC—water clarity scale in this case is: 4—highest water clarity; 1—lowest water clarity) and still produce dry oil (low BS&W) while avoiding the corrosive character of clarifiers with high halogen content. The difference between the copolymers 2132-176 and 2132-174 is a slightly different ratio of comonomers and molecular weight than in 2132-12. Drying oil is defined herein as removing water from the oil.

Example 8

Figure 3:
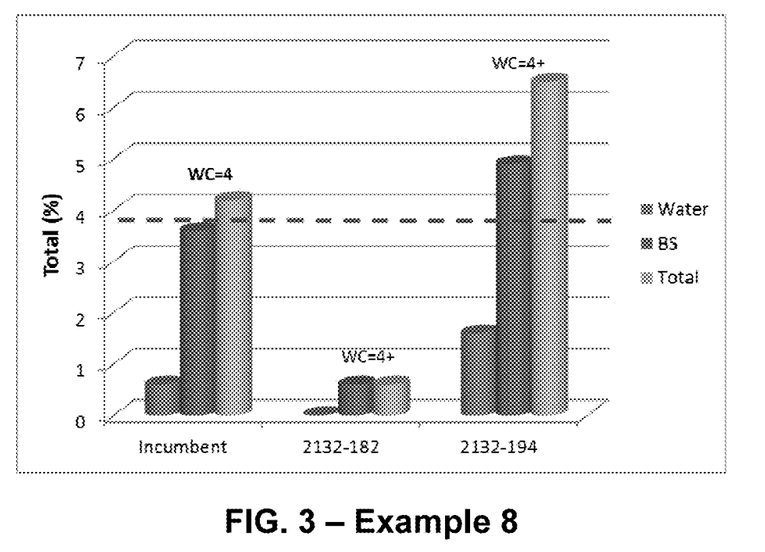
FIGS. 3-6 are graphs of water clarification and BS&W for Examples 8-11, respectively.

In a different non-limiting embodiment, FIG. 3 presents cut data comparison for water clarifiers which are copolymers of PEGMA, acrylamide and APTAC vs. the incumbent (polycondensate type water clarifier) at 200 ppm. A TRETOLITE™ DMO8663X demulsifier available from Baker Hughes Incorporated was added together with the water clarifier to the produced fluid. This is a typical procedure for SAGD applications. The same amount of demulsifier was used together with each water clarifier so the direct comparison of the performance of different water clarifiers was possible. Sample 2132-182 is built from the three co-monomers described while sample 2132-194 has the same monomer composition as 2132-182 but no PEGMA. It is clear that the sample 2132-182 which includes PEGMA in the structure has a significantly lower BS&W. It also outperformed the incumbent in terms of water clarity and BS&W (where the WC—water clarity scale in this case is: 4—highest water clarity; 1—lowest water clarity).

Example 9

Figure 4:
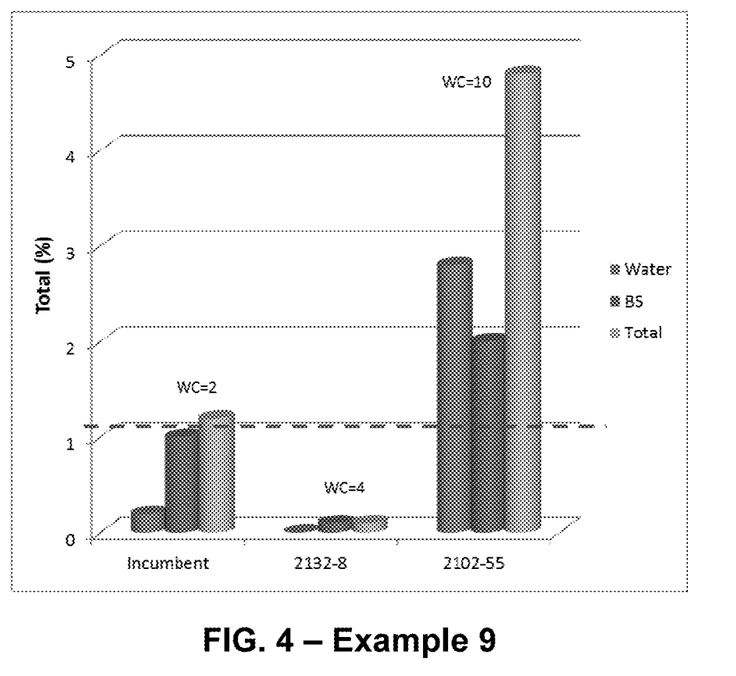

FIG. 4 presents cut data comparison for water clarifiers which are copolymers of PEGMA, acrylamide and AETAC built with the same ratio of two monomers (acrylamide/AETAC) and different amounts of PEGMA: very low for 2102-55 and high for 2132-8. Samples were tested against the incumbent polycondensate type water clarifier at 150 ppm and in the presence of 200 ppm of a TRETOLITE™ DMO8663X demulsifier available from Baker Hughes Incorporated. It can be concluded that the sample with the higher amount of PEGMA in the composition had significantly better water clarity (where the WC—water clarity scale in this case is: 1—highest water clarity; 10—lowest water clarity) as well as an oil phase with very low BS&W. Increasing amount of PEGMA in the polymer structure clearly improved the results and helped the R&D sample outperform the incumbent.

Example 10

Figure 5:
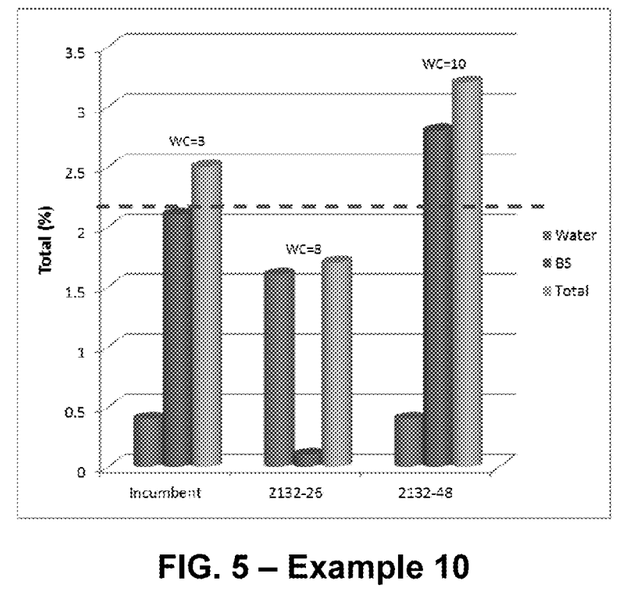

FIG. 5 presents cut data comparison for water clarifiers which are copolymers of PEGMA, acrylamide and MAETAC with the same ratio of two monomers (acrylamide/MAETAC) and with or without PEGMA as a third co-monomer, 2132-26 and 2132-48 respectively. Samples were tested against the incumbent (polycondensate type water clarifier) at 200 ppm and in the presence of 200 ppm of a TRETOLITE™ DMO8663X demulsifier available from Baker Hughes Incorporated. It can be concluded that samples with no PEGMA had worse water clarity (where the WC—water clarity scale in this case is: 1—highest water clarity; 10—lowest water clarity) as well as resulted in oil phase with very high BS&W. Incorporating PEGMA in the polymer structure clearly improved the results and overall water clarifier performance.

Example 11

Figure 6:
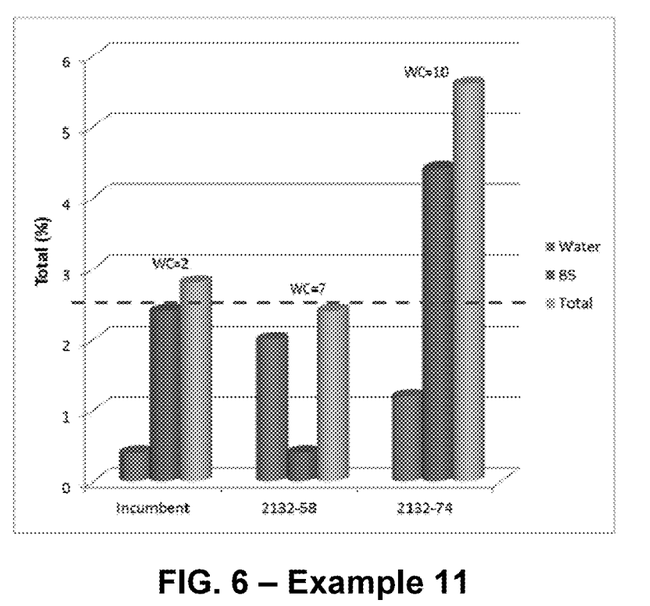

FIG. 6 presents cut data comparison for water clarifiers which are copolymers of PEGA, acrylamide and MAETAC with the same ratio of two monomers (acrylamide/MAETAC) and with or without PEGA as a third co-monomer, 2132-58 and 2132-74 respectively. Samples were tested against the incumbent (polycondensate type water clarifier) at 200 ppm and in the presence of 200 ppm of a TRETO-LITE™ DMO8663X demulsifier available from Baker Hughes Incorporated. It can be concluded that samples with no PEGA had worse water clarity (where the WC—water clarity scale in this case is: 1—highest water clarity; 10—lowest water clarity) as well as resulted in oil phase with very high BS&W. Incorporating PEGA in the polymer structure clearly improved the results and overall water clarifier performance.

In general, FIG. 1 and Examples 1-6 illustrate that the two- and three-monomer copolymers work well and clarify the water phase as well as dry the oil phase when compared to blank as well as incumbent. FIG. 2 and Example 6 confirm that two-monomer copolymer works well. FIGS. 3-6 and Examples 7-10 show results using the three-monomer copolymers and confirm that PEGMA/PEGA are responsible for better performance. The Examples also illustrate that copolymers without PEGMA/PEGA or with only small amounts of them in the copolymer structure do not clarify water or dry oil phase efficiently.

Example 12

Figure 7:
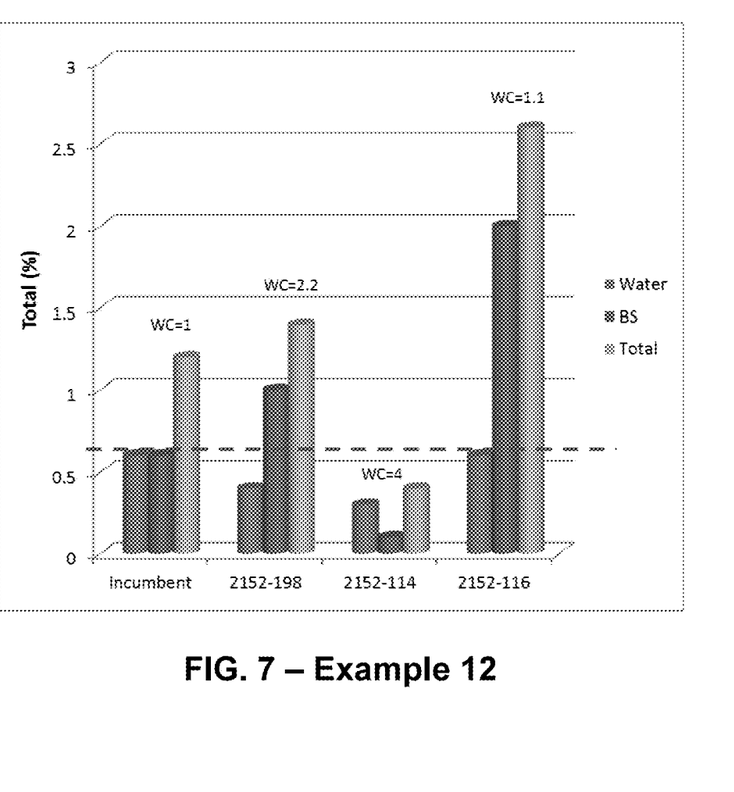
FIG. 7 is a graph showing water clarification and BS&W testing results from Example 12.

FIG. 7 presents cut data comparison for water clarifier 2152-198 which is a copolymer of PEGMA, hydroxyethyl acrylate and AETAC. The water clarifier 2152-114 has the same composition as 2152-198 but no AETAC and the copolymer 2152-116 has the same composition as 2152-198 but no PEGMA. Samples were tested against the incumbent (polyacrylamide type water clarifier) at 200 ppm and in the presence of 250 ppm of a TRETOLITE™ DM08648 demulsifier available from Baker Hughes Incorporated. It can be concluded that the polymer with three co-monomers 2152-198 had slightly better water clarity than the incumbent (where the WC—water clarity scale in this case is: 4—highest water clarity; 1—lowest water clarity) but did not provide lower BS&W. The polymer with two co-monomers 2152-114 had the highest water clarity and also better BS&W than the incumbent. The polymer without the PEGMA 2152-116 performed the worse in terms of water clarity and BS&W.

In the foregoing specification, the invention has been described with reference to specific embodiments thereof, and has been described as effective in providing processes for clarifying and drying a fluid by admixing a fluid and a copolymer, such as a copolymer of acrylamide and PEGMA or a copolymer of acrylamide, PEGMA and (3-acrylamidopropyl)-trimethylammonium chloride. However, it will be evident that various modifications and changes can be made thereto without departing from the broader spirit or scope of the invention as set forth in the appended claims. Accordingly, the specification is to be regarded in an illustrative rather than a restrictive sense. For example, specific fluids, copolymers, monomers, solvents, phases, proportions, falling within the claimed parameters, but not specifically identified or tried in a particular process, are expected to be within the scope of this invention.

The present invention may suitably comprise, consist or consist essentially of the elements disclosed and may be practiced in the absence of a disclosed element or in the absence of an element not disclosed. For instance, there may be provided a process of clarifying an aqueous phase of a fluid comprising a hydrocarbon phase and the aqueous phase, and optionally drying a fluid that consists essentially of or consists of admixing the fluid and a copolymer that comprises, consists essentially of, or consists of a copolymer of a first monomer selected from the group consisting of poly(ethylene glycol) methyl ether methacrylate (PEGMA), poly(ethylene glycol) methyl ether acrylate (PEGA), poly (ethylene glycol) methacrylate, poly(ethylene glycol) acrylate, poly(propylene glycol) methyl ether methacrylate (PPGMA), poly(propylene glycol) methyl ether acrylate (PPGA), poly(propylene glycol) methacrylate, poly(propylene glycol) acrylate, and combinations thereof and a second monomer selected from the group consisting of acrylamide, 2-hydroxyethyl acrylate, 2-hydroxyethyl methacrylate, hydroxypropyl acrylate, hydroxypropyl methacrylate, 4-hydroxybutyl acrylate, N-hydroxyethyl acrylamide, N-hydroxymethyl acrylamide, N-isopropylacrylamide, N-methylacrylamide, N-ethylacrylamide, N-propylacrylamide, methacrylamide, N,N-dimethylacrylamide, N,N-diethylacrylamide, N-tert-butylacrylamide, N-[3-(dimethylamino) propyl]methacrylamide, N-[3-(dimethylamino)propyl]acrylamide, 2-(dimethylamino)ethyl acrylate, 2-(dimethylamino)ethyl methacrylate, 3-(dimethylamino) propyl acrylate, 3-(dimethylamino)propyl methacrylate, 2-(diethylamino)ethyl methacrylate, 2-(diethylamino)ethyl acrylate and combinations thereof, optionally including a third monomer consisting of (3-acrylamidopropyl)trimethylammonium chloride (APTAC), [2-(acryloyloxy)ethyl] trimethylammonium chloride (AETAC), [2-(methacryloyloxy)ethyl]trimethylammonium chloride (MAETAC), [3-(methacryloylamino)propyl]trimethylammonium chloride (MAPTAC), 2-acrylamido-2-methylpropane sulfonic acid, [2-(methacryloyloxy)ethyl]dimethyl-(3-sulfopropyl)ammonium hydroxide, [3-(methacryloylamino)propyl]dimethyl (3-sulfopropyl)ammonium hydroxide, acrylic acid, methacrylic acid, styrenesulfonic acid, diallyldimethyl ammonium chloride (DADMAC), acryloyloxyethyldimethylbenzyl ammonium chloride (AEDBAC), methacryloyloxyethyldi-methylbenzyl ammonium chloride (MEDBAC) and combinations thereof, where the copolymer is present in the fluid in an amount effective to simultaneously clarify the water component and optionally dry the hydrocarbon component.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A process for clarifying an aqueous phase of a production fluid comprising a hydrocarbon phase and the aqueous phase, the process consisting of:
    admixing the fluid and a copolymer; and wherein the copolymer is prepared by copolymerizing monomers consisting of:
        a first monomer selected from the group consisting of poly(ethylene glycol) methyl ether methacrylate, poly(ethylene glycol) methyl ether acrylate, poly(ethylene glycol) methacrylate, poly(ethylene glycol) acrylate, and combinations thereof; and
        a second monomer selected from the group consisting of 2-hydroxyethyl acrylate, 2-hydroxyethyl methacrylate, hydroxypropyl acrylate, hydroxypropyl methacrylate, 4-hydroxybutyl acrylate, and combinations thereof;
    where the copolymer is present in the fluid in an amount from about 0.1 ppm to about 5,000 ppm effective to clarify the aqueous phase.

2. The process of claim 1 where the process further comprises drying the hydrocarbon phase of the fluid.

3. The process of claim 2 where the drying of the hydrocarbon phase is measured by basic sediment/emulsion and free water (BS&W) achieved, and the BS&W is lower using the copolymer as compared with an otherwise identical copolymer absent the first monomer.

4. The process of claim 1, wherein the production fluid comprises a discontinuous aqueous phase and a continuous hydrocarbon phase.

5. The process of claim 1, wherein the production fluid comprises a discontinuous hydrocarbon phase and a continuous aqueous phase.

6. The process of claim 1 further comprising at least partially separating the phases and removing the hydrocarbon phase from the aqueous phase.

7. A process for clarifying an aqueous phase of produced water comprising a hydrocarbon phase and the aqueous phase, the process consisting of:
    admixing the produced water and a copolymer; wherein the copolymer is prepared by copolymerizing monomers consisting of:
        a first monomer selected from the group consisting of poly(ethylene glycol) methyl ether methacrylate, poly(ethylene glycol) methyl ether acrylate, and combinations thereof; and
        a second monomer selected from the group consisting of 2-hydroxyethylacrylate, 2-hydroxyethyl methacrylate, hydroxypropyl acrylate, hydroxypropyl methacrylate, 4-hydroxybutyl acrylate, and combinations thereof;
    where the copolymer is present in the produced water in an amount from about 0.1 ppm to about 1,000 ppm effective to clarify the aqueous phase.

8. The process of claim 7 where the process further comprises simultaneously drying the hydrocarbon phase of the produced water.

9. The process of claim 7, wherein the hydrocarbon phase in the produced water is crude oil.

10. The process of claim 7 further comprising at least partially separating the phases and removing the hydrocarbon phase from the aqueous phase.

* * * * *